Sept. 9, 1941.   O. SCHILLING   2,255,742

FLEXIBLE COUPLING FOR SOUND RECORDING DEVICES

Filed Aug. 9, 1939

Inventor:
Otto Schilling
by E. D. Kinney
Atty

Patented Sept. 9, 1941

2,255,742

UNITED STATES PATENT OFFICE 2,255,742

FLEXIBLE COUPLING FOR SOUND RECORDING DEVICES

Otto Schilling, Berlin, Germany, assignor to C. Lorenz Aktiengesellschaft, Berlin-Tempelhof, Germany, a company Application August 9, 1939, Serial No. 289,204
In Germany August 12, 1938

1 Claim. (Cl. 64—30)

The invention relates to sound recording machines of the kind designated as steel tone machines.

In these devices, when reversing the direction of operation, that is, when changing from recording to the operation of unwinding the record carrier, the mechanism has to withstand considerable stress because it has to aid in driving one of the drums. In accordance with the invention a friction coupling or slipping clutch is arranged to interconnect the record carrier drum and the drive therefor. This coupling may comprise two concentric rings coupled together by flat springs located in circumferential grooves of the rings.

Figure 1:
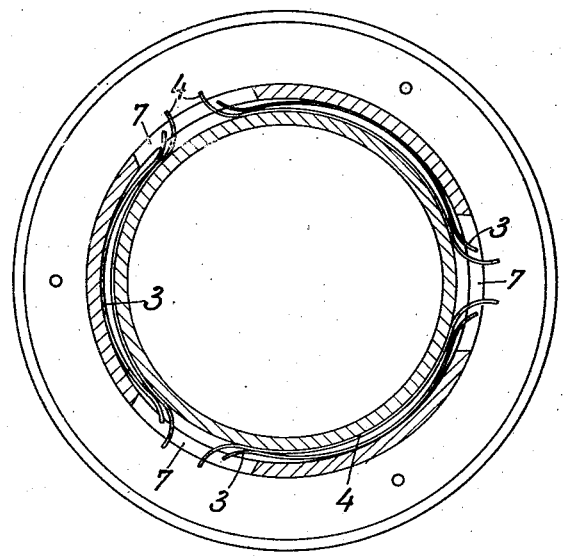
Figure 2:
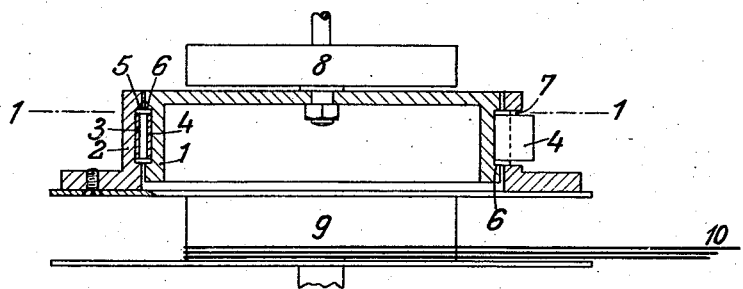

An embodiment of this kind is described hereafter with reference to the accompanying drawing, in which Fig. 1 shows a section through this embodiment on line 1—1 of Fig. 2, whilst Fig. 2 represents a section taken at right angles to that shown in Fig. 1.

Between a ring 1 and a ring 2 encircling the former flat springs 3 are located in a manner to couple the two rings together by frictional contact. The springs are guided by a groove 5 of ring 2 and a groove 6 of ring 1. Ring 2 has openings 7 which allow of inserting the springs 3 after ring 1 has been mounted within ring 2. In order to prevent the springs from gliding out of the openings 7 sheet metal strips 4 are arranged between the springs 3 and ring 1, the end portions of these strips being bent to form stops for the springs 3. To ring 2 a drive pulley 8 is fastened while with ring 1 a drum 9 for the record carrier 10 is rigidly connected. The strength of the springs 3 must be such that the ring 1 shall slide within ring 2 before the stress of breaking the record carrier is attained. Preferably, three such springs are provided, these at the same time acting to center the ring 1. It is to be understood, however, that any desired or suitable number of such springs may be provided.

What is claimed is:

A flexible coupling means comprising a first drum member fastened to one rotatable means, a second drum member having an opening therein and arranged about said first drum member so that the inner face of said outer drum and the outer face of said inner drum are spaced a small distance from one another, a spring member insertable into said space for exerting a friction coupling pressure between said drum members, and a retaining member fitted to the curvature of said first drum member and arranged between said spring member and said first drum, the ends of said retaining member extending through said opening beyond the ends of said spring member, whereby said spring member is retained in place.

OTTO SCHILLING.